United States Patent [19]
Zumach et al.
[11] 3,868,404
[45] Feb. 25, 1975

[54] SUBSTITUTED METHYL ETHERS OF 2-BRANCHED-ALKYL-4,6-DINITROPHENOLS

[75] Inventors: Gerhard Zumach; Ingeborg Hammann, both of Cologne; Günter Unterstenhöfer, Opladen; Richard Wegler, Leverkusen, all of Germany

[73] Assignee: Bayer Aktiengesellschaft, Leverkusen, Germany

[22] Filed: Jan. 14, 1972

[21] Appl. No.: 217,932

Related U.S. Application Data

[62] Division of Ser. No. 31,784, April 24, 1970, Pat. No. 3,683,031.

[52] U.S. Cl. ..... 260/471 C, 260/558 R, 260/558 D, 260/562 A, 260/562 B, 260/613 D, 424/300, 424/320, 424/324, 424/340

[51] Int. Cl. .......... C07c 125/06

[58] Field of Search ........ 260/471 C, 558 R, 558 D, 260/562 A, 562 B

[56] References Cited

UNITED STATES PATENTS 3,660,465 5/1972 Baker .......... 260/471 C

*Primary Examiner*—Lorraine Weinberger
*Assistant Examiner*—L. A. Thaxton
*Attorney, Agent, or Firm*—Burgess, Dinklage & Sprung

[57] ABSTRACT

Substituted methyl ethers of 2-branched-alkyl-4,6-dinitrophenol, i.e. ethers wherein the methyl group, which may be substituted by an optionally halogen-substituted alkyl radical, is substituted by an alkoxy or amido group, which possess arthropodicidal, and especially acaricidal and insecticidal, properties and a process for their production.

3 Claims, No Drawings

SUBSTITUTED METHYL ETHERS OF 2-BRANCHED-ALKYL-4,6-DINITROPHENOLS

This is a division, of application Ser. No. 31,784 filed Apr. 24, 1970, now U.S. Pat. No. 3,683,031, issued Aug. 8, 1972.

The present invention relates to and has for its objects the provision of particular new substituted methyl ethers of 2-branched-alkyl-4,6-dinitrophenol, i.e. ethers wherein the methyl group, which may be substituted by an optionally halogen-substituted alkyl radical, is substituted by an alkoxy or amido group, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is known that certain 2-alkyl-4,6-dinitrophenol derivatives, for example the ester of the formula:

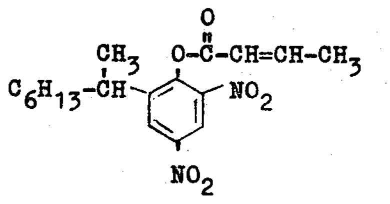

(A)

can be used as acaricides (see The Journal of Horticultural Science 34, 39–50 (1959).

It has now been found, in accordance with the present invention, that the particular new 2-alkyl-4,6-dinitrophenol derivatives of the formula:

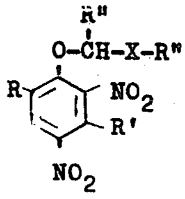

(I)

in which

X represents oxygen or —NH—,

R represents a branched alkyl radical with 3-12 carbon atoms,

R′ represents hydrogen or methyl,

R″ represents hydrogen or an optionally halogensubstituted alkyl radical, and

R‴, when X denotes oxygen, represents an optionally halogen-substituted aliphatic hydrocarbon, cycloalkyl or aralkyl residue; and R‴, when X denotes the NH-group, represents an optionally halogen-substituted aliphatic carboxylic acid residue, an optionally halogen-substituted or nitro-substituted benzoic acid residue, an optionally halogen-substituted aliphatic oxycarbonyl mercaptocarbonyl residue, or a halogen-, alkyl- or halogen-alkyl-substituted aromatic oxycarbonyl or mercaptocarbonyl residue.

The compounds of formula (I) as defined above possess strong acaricidal and insecticidal properties.

The present invention also provides a process for the preparation of the 2-alkyl-4,6-dinitrophenol derivatives of formula (I) in which reacting a 2-alkyl-4,6-dinitrophenol of the formula:

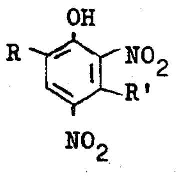

(II)

with a compound of the formula:

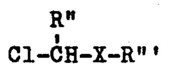

(III)

in which R, R′, R″ and R‴ have the abovementioned significance, optionally in the presence of a solvent and an acid-binding agent.

Surprisingly, the 2-alkyl-4,6-dinitrophenol derivatives obtainable according to the present invention show higher acaricidal and insecticidal activity than the chemically similar 2-alkyl-4,6-dinitrophenol derivatives known in the art. The substances according to the invention thus represent an enrichment of the art.

If 2-sec.-butyl-4,6-dinitrophenol and chloromethyl-propargyl-ether are used as starting substances, the course of the reaction can be represented by the following equation:

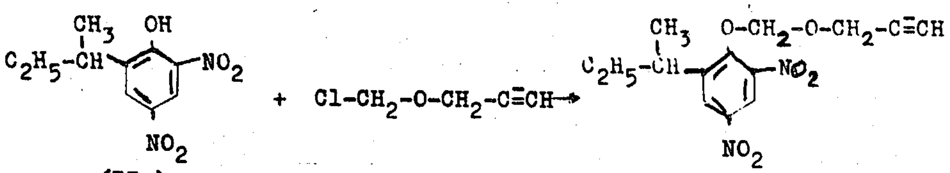

(IIa) (IIIa) (I)

The phenols to be used for the reaction according to the invention are defined by the formula (II) given above. In the above formulae, R preferably represents alkyl with 3-8 carbon atoms, especially isopropyl, sec.-butyl, tert.-butyl, pentyl-(2), hexyl-(2), heptyl-(2), octyl-(2) and octyl-(3). R′ represents hydrogen or methyl.

As examples of the phenols which can be used according to the invention, the following may be named: 2-Isopropyl-4,6-dinitrophenol, 2-sec.-butyl-4,6-dinitrophenol, 2-sec.-butyl-5-methyl-4,6-dinitrophenol, 2-tert.-butyl-4,6-dinitrophenol, 2-tert.-butyl-5-methyl-4,6-dinitrophenol, 2-(pentyl-(2))-4,6-dinitrophenol, 2-(pentyl-(2))-5-methyl-4,6-dinitrophenol, 2-(octyl-(3))-4,6-dinitrophenol, 2-(octyl-(4))-4,6-dinitrophenol, 2-(decyl-(2))-4,6-dinitrophenol and 2-(decyl-(4))-4,6-dinitrophenol.

The α-chloro ethers or N-α-chloroalkylamides to be used for the reaction according to the invention are defined by the formula (III) given above. In the above formulae R″ represents hydrogen or alkyl with 1-3 carbon atoms which may be substituted by halogen, preferably by chlorine or bromine, for example methyl, ethyl, propyl, isopropyl, trichloromethyl, and the like.

If X represents oxygen, R‴ preferably denotes alkyl with 1-12 carbon atoms; or alkenyl or alkinyl with 3–5 carbon atoms; or cycloalkyl radicals with 5–7 carbon atoms in the ring system; or aralkyl radicals which contain 1–4 carbon atoms in the aliphatic chain and wherein the aromatic radical is preferably a phenyl radical; the radicals may be substituted by halogen, preferably by chlorine or bromine.

If X represents the NH- group, R''' preferably denotes the aliphatic carboxylic acid residue of an alkane- or alkene carboxylic acid with 1–5 carbon atoms, which is optionally substituted by halogen (fluorine, chlorine or bromine); or a benzoic acid residue which is optionally substituted by chlorine or nitro groups; or an alkoxy-carbonyl or alkylmercaptocarbonyl radical with 2–13 carbon atoms; or an alkenoxycarbonyl or alkenylmercaptocarbonyl radical with 4 or 5 carbon atoms; or a phenoxycarbonyl or phenylmercaptocarbonyl radical. These oxycarbonyl or mercapto-carbonyl-containing radicals may be substituted by halogen, preferably chlorine and fluorine. The phenyl radicals noted above may be further substituted by alkyl with 1–12 carbon atoms and halogenalkyl, preferably lower halogenalkyl residues, especially with chlorine and/or fluorine as halogen, for example, trichloromethyl, trifluoromethyl, and the like.

As examples of the α-chloro ethers and N-α-chloroalkylamides which may be used according to the invention, the following may be mentioned:

Chlorodimethyl-ether, chloromethyl-ethyl-ether, chloromethyl-2-chloroethyl-ether, chloromethyl-propyl-ether, chloromethyl-isopropyl-ether, chloromethyl-isobutyl-ether, chloromethyl-2-methylpentyl-(2)-ether, chloromethyl-2,2-dimethylbutyl-(1)-ether, chloromethyl-2,2-dimethyloctyl-(1)-ether, chloromethyl-dodecyl-ether, 1-chloroethyl-methyl-ether, 1-chloroethyl-ethyl-ether, 1-chloroethyl-octyl-(1)-ether, 1,2,2,-2-tetrachloroethyl-methyl-ether, 1,2,2,2-tetrachloroethylisopropylether, 1-chlorobutyl-methyl-ether, chloromethylallyl-ether, chloromethyl-propargyl-ether, 1,2,2,2-tetrachloroethyl-allyl-ether, 1,2,2,2-tetrachloroethyl-propargyl-ether, chloromethyl-2,3-dibromallyl-ether, chloromethyl-4-chlorobutine-(2)-(1)-ether, chloromethylcyclohexyl-ether, chloromethylbenzyl-ether, chloromethyl-4-chlorobenzyl-ether, chloromethylacetamide, 1-chloropropylacetamide, chloromethyltrichloroacetic acid amide, chloromethylisobutyric acid amide, chloromethylacrylic acid amide, chloromethylcrotonic acid amide, chloromethylbenzamide, chloromethyl-4-chlorobenzamide, chloromethylcarbamic acid methyl ester, chloromethyl-carbamic acid ethyl ester, chloromethyl-monothiocarbamic acid-S-methyl ester, 1,2,2,2-tetrachloroethyl-formamide, -acetamide, -chloroacetic acid amide, -trichloroacetic acid amide, fluoracetamide, -propionic acid amide, -3-chloropropionic acid amide, -pivalic acid amide, -acrylic acid amide, -crotonic acid amide, -benzamide, -3,4-dichlorobenzamide, -2,5-dichlorobenzamide, -nitrobenzamide, -4-nitrobenzamide, -1-chloro-5-nitrobenzamide, -carbamic acid methyl ester, -carbamic acid 2-chloroethylester, -carbamic acid isopropyl ester, -carbamic acid dodecyl ester, -carbamic acid allyl ester, -carbamic acid phenyl ester, -carbamic acid 4-chlorophenyl ester, -carbamic acid 4-trifluoromethylphenyl ester, 1,2,2,2-tetrachloroethyl-carbamic acid 2,4-dichlorophenyl ester, 1,2,2,2-tetrachloroethylmonothiocarbamic acid-S-methyl ester, -S-butyl ester, -S-dodecyl ester, -S-allyl ester, -S-phenyl ester, -S-4-tert.-butylphenyl ester and 1,2,2,2-tetrachloroethyl-monothiocarbamic acid-S-(4-chlorophenyl) ester.

The α-chloro ethers used as starting substances are largely known and can be manufactured in a simple manner from the corresponding alcohols with aldehydes in the presence of dry hydrogen chloride, directly or in an inert solvent. Equally, the N-α-chloroalkylamides are generally known and can be obtained from the corresponding amides and aldehydes via the N-α-hydroxyalkylamides and subsequent chlorination with thionyl chloride.

The reaction according to the invention is preferably carried out in the presence of a solvent (which term includes a mere diluent). When working with solvents, those which do not react with the α-chloro ethers or N-α-chloroalkylamides are preferably used. As such solvents there may, for example, be mentioned: hydrocarbons such as benzene and toluene, chlorinated hydrocarbons such as dichloroethane, chloroform, chlorobenzene and dichlorobenzene, ethers such as tetrahydrofuran, dibutyl ether and dioxane, and mixtures thereof.

All customary tertiary amines can be used as a hydrogen chloride acceptor (acid-binding agent) such as dimethylaniline, pyridine, and the like. Triethylamine is particularly suitable.

The reaction temperatures can be varied over a wide range. In general the process is carried out at 0° to 100°C, preferably at 40° to 60°C, or at the boiling point of the solvent, if one is used.

In general, the reagents are used in approximately equimolar quantity ratios. In some cases, especially when using the α-chloro ethers, an excess of compound containing active chlorine proves advantageous. The reaction can, for example, be carried out by adding dropwise to a solution of the appropriate α-chloro-ether or N-α-chloroalkylamide in benzene or dioxane at room temperature a solution of the corresponding phenol and triethylamine in the same solvent, subsequently stirring for several hours at 50° – 60°C, filtering off the triethylammonium chloride which has precipitated and evaporating the solvent in vacuo. The products which result are mostly oils and can be purified by reprecipitation from hot cleaning benzine. Crystalline compounds may be recrystallized from a suitable solvent.

The active substances according to the invention show strong insecticidal and acaricidal actions while having low toxicity to warm-blooded animals and low phytotoxicity. The actions manifest themselves rapidly and continue for a long time. The can therefore be used with good success for combating harmful sucking and biting insects, diptera as well as mites in the plant protection field and in hygiene endeavors, and, because of their high alkali resistance, especially for the treatment of lime-washed walls.

To the sucking insects contemplated herein there belong, in the main, aphids, such as the green peach aphid (*Myzus persicae*), the bean aphid (*Doralis fabae*); scales, such as *Aspidiotus hederae*, *Lecanium hesperidum*, *Pseudococcus maritimus; Thysanoptera*, such as *Hercinothrips femoralis;* and bugs, such as the beet bug (*Piesma quadrata*) and the bed bug (*Cimex lectularius*); and the like.

With the biting insects contemplated herein, there are classed, in the main butterfly caterpillars, such as *Plutella maculipennis*, *Lymantria dispar;* beetles, such as granary weevils (*Sitophilus granarius*), the Colorado beetle (*Leptinotarsa decemlineata*), and also species living in the soil, such as the wireworms (*Agriotes sp.*) and larvae of the cockchafer (*Melolontha melolontha*); cockroaches, such as the German cockroach (*Blatella germanica*); Orthoptera, such as the house cricket (*Acheta domestica*); termites such as *Reticulitermes; Hymenoptera*, such as ants; and the like.

The *Diptera* comprise, in particular, the flies, such as the vinegar fly (*Drosophila melanogaster*); the Mediterranean fruit fly (*Ceratitis capitata*), the house fly (*Musca domestica*), and mosquitoes, such as the yellow fever mosquito (*Aedes aegypti*); and the like.

In the case of the mites, particularly important are the spider mites (*Tetranychidae*) such as the two-spotted spider mite (*Tetranychus urticae*), the European red mite (*Panonychus ulmi*); gall mites, such as the currant gall mite (*Eriophyes ribis*) and tarsonemids, such as *Tarsonemus pallidus*, and ticks; and the like.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005–20%, preferably 0.001–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.001–90%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 40 to about 95% by weight of the active compound or even the 100% active substance alone, e.g. about 40–100% by weight of the active compound.

In particular, the present invention contemplates methods of selectively killing, combating or controlling pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative or toxic amount, i.e. an arthropodicically, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The 2-alkyl-4,6-dinitrophenol derivatives obtainable according to the invention furthermore exhibit fungitoxic properties, for example against genuine mildew fungi and soil fungi. They can be used as pickling agents or soil treatment agents for combating fungal plant diseases. Finally, they possess an anti-microbial and rodenticidal action, and furthermore a repellent action against warm-blooded animals.

The unexpected superiority and outstanding activity of the particular new compounds of the present invention is illustrated without limitation by the following examples:

Example 1

| *Tetranychus* test | |
|---|---|
| Solvent: | 3 parts by weight of dimethylformamide |
| Emulsifier: | 1 part by weight alkylaryl polyglycol ether |

To produce a suitable preparation of active compound, 1 part by weight of the active compound is mixed with the stated amount of solvent containing the stated amount of emulsifier and the concentrate so obtained is diluted with water to the desired final concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed, whereas 0% means that none of the spider mites are killed.

The active compounds, the concentrations of the active compounds, the evaluation times and the results can be seen from the following Table 1:

TABLE 1

(Mites which damage plants)

Tetranychus Test

| Active Compounds | Active Compound Concentration in % | Degree of Destruction in % after 48 hours |
|---|---|---|
| 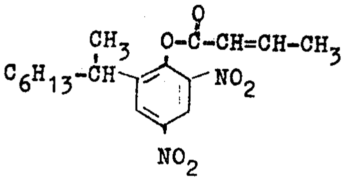 (A) (known) | 0.02<br>0.002 | 100<br>0 |
| 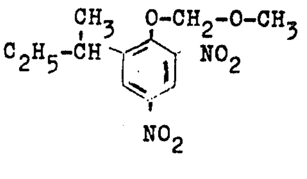 (2) | 0.02<br>0.002 | 99<br>65 |
| 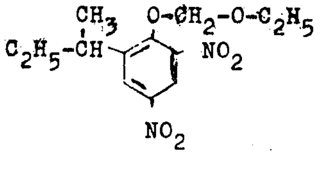 (3) | 0.02<br>0.002 | 100<br>95 |

TABLE 1 ((Cont'd)
(Mites which damage plants)
Tetranychus Test
| Active Compounds | Active Compound Concentration in % | Degree of Destruction in % after 48 hours |
|---|---|---|
| 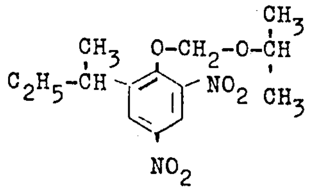 (4) | 0.02 | 100 |
| | 0.002 | 45 |
| 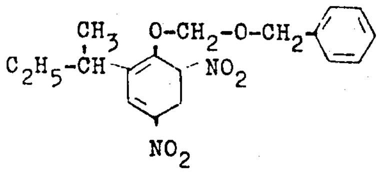 (5) | 0.02 | 100 |
| | 0.002 | 100 |
| 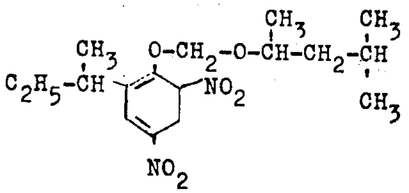 (6) | 0.02 | 100 |
| | 0.002 | 100 |
| 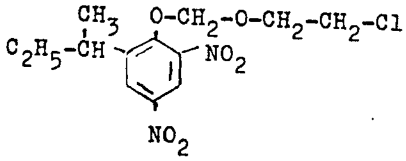 (7) | 0.02 | 100 |
| | 0.002 | 100 |
| 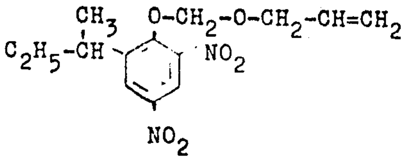 (8) | 0.02 | 100 |
| | 0.002 | 99 |
| 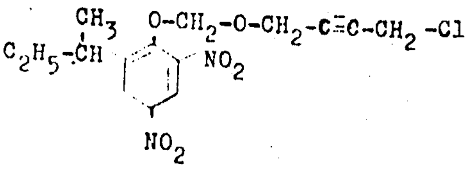 (9) | 0.02 | 100 |
| | 0.002 | 100 |

TABLE 1 (Cont'd)

| Active Compounds | Active Compound Concentration in % | Degree of Destruction in % after 48 hours |
|---|---|---|
| 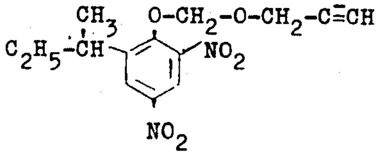 (10) | 0.02<br>0.002 | 100<br>100 |
| 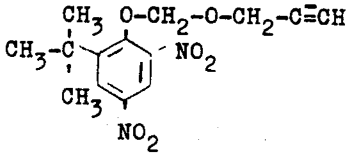 (11) | 0.02<br>0.002 | 100<br>100 |

EXAMPLE 2

| *Phaedon* larvae test | |
|---|---|
| Solvent | 3 parts by weight of dimkethylformamide |
| Emulsifier: | 1 part by weight of alkylaryl poly-glycol ether |

To produce a suitable preparation of active compound, 1 part by weight of the active compound is mixed with the stated amount of solvent containing the stated amount of emulsifier, and the concentrate is diluted with water to the desired final concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed; 0% means that none of the beetle larvae are killed.

The active compounds, the concentration of the active compounds, the times of evaluation and the results can be seen from the following Table 2:

TABLE 2

(Insects which damage plants)

Phaedon Larvae Test

| Active Compounds | Active Compound Concentration in % | Degree of Destruction in % after 3 da[illegible] |
|---|---|---|
| 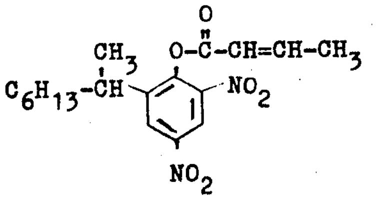 (A) (known) | 0.2<br>0.02 | 100<br>0 |
| 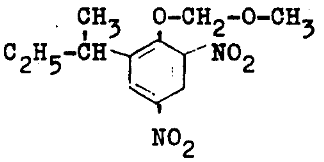 | 0.2<br>0.02 | 100<br>85 |

TABLE 2 (Cont'd)
| Active Compound | Active Compound Concentration in % | Degree of Destruction in % after 3 days |
| --- | --- | --- |
| (2) 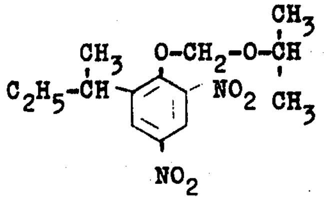 | 0.2<br>0.02 | 100<br>98 |
| (4) 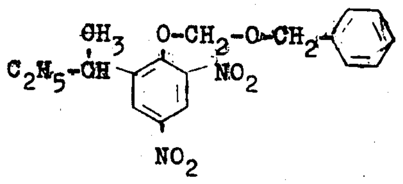 | 0.2<br>0.02 | 100<br>90 |
| (5) 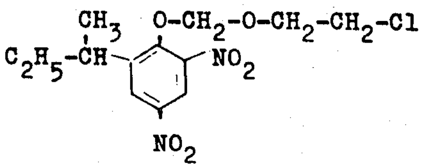 | 0.2<br>0.02 | 100<br>100 |
| (7) 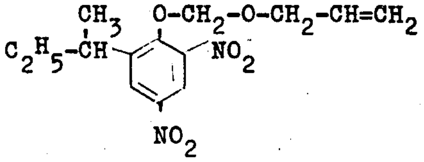 | 0.2<br>0.02 | 100<br>100 |
| (8) 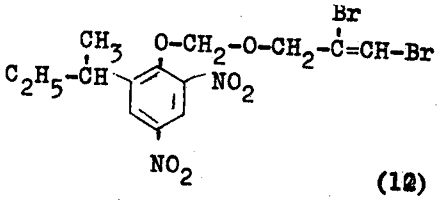 | 0.2<br>0.02 | 100<br>80 |
| (12) 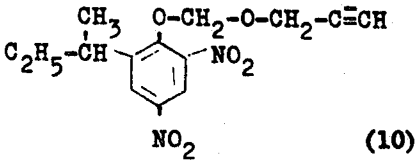 | 0.2<br>0.02 | 100<br>100 |
| (10) 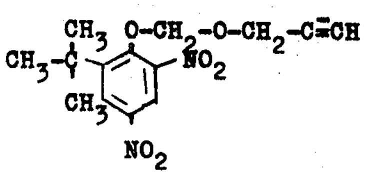 | 0.2<br>0.02<br>0.002 | 100<br>100<br>40 |

TABLE 2 (Cont.d)
| Active Compound | Active Compound Concentration in % | Degree of Destruction in % after 3 days |
|---|---|---|
| (11) 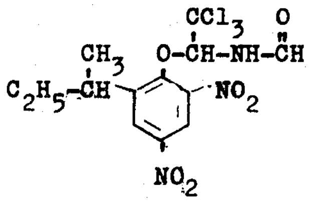 | 0.2<br>0.02 | 100<br>70 |
| 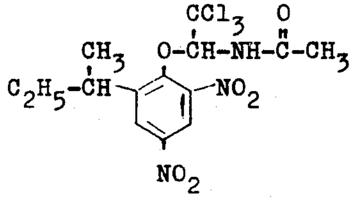 (13) | 0.2<br>0.02 | 100<br>80 |
| (14) 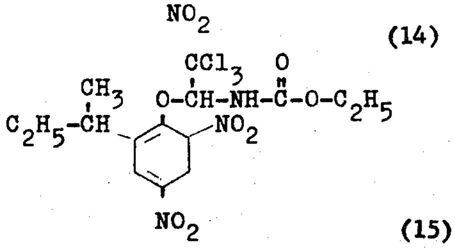 | 0.2<br>0.02 | 100<br>90 |
| (15) 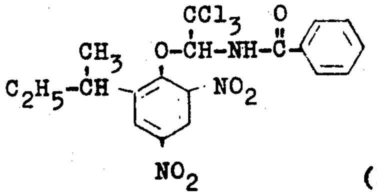 | 0.2<br>0.02 | 100<br>80 |
| (16) 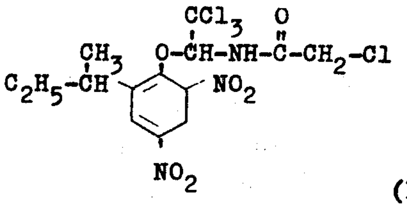 | 0.2<br>0.02 | 100<br>80 |
| (17) 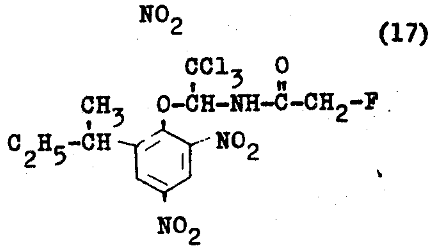 | 0.2<br>0.02 | 100<br>100 |
| (18) 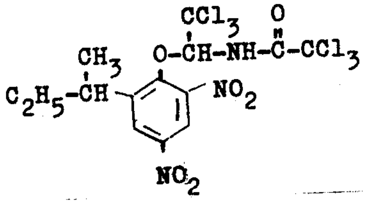 | 0.2<br>0.02 | 100<br>80 |
| (19) 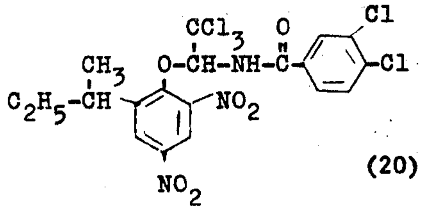 (20) | 0.2<br>0.02 | 100<br>60 |

EXAMPLE 3

| *Myzus* test | (contact action) |
|---|---|
| Solvent: | 3 parts by weight of dimethylformamide |
| Emulsifier: | 1 part by weight of alkylaryl polyglycol ether |

To produce a suitable preparation of active compound, 1 part by weight of the active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed, whereas 0% means that none of the aphids are killed.

The active compounds, the concentrations of the active compounds, the evaluation times and the results can be seen from the following Table 3:

TABLE 3

(Insects which damage plants)

Myzus Test

| Active compounds | Active Compound Concentration in % | Degree of Destruction in % after 24 hours |
|---|---|---|
| 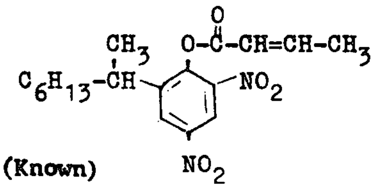 (A) (Known) | 0.2 | 0 |
| 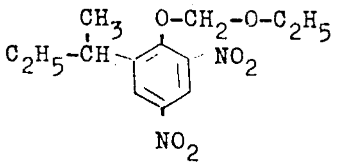 | 0.2 | 100 |
| (3) 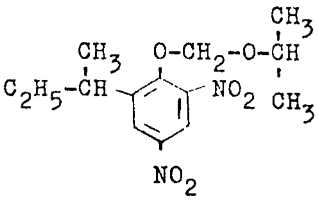 | 0.2 | 100 |
| (4) 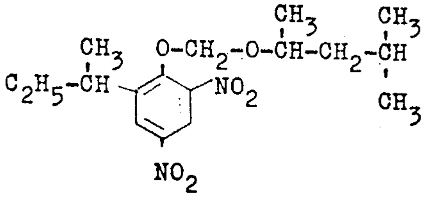 | 0.2 | 100 |
| (6) 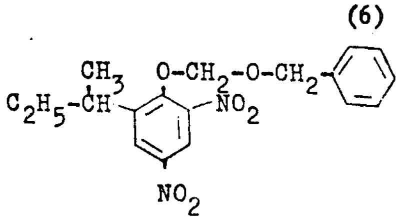 | 0.2 | 95 |

TABLE 3 (Cont'd)
| Active Compounds | Active Compound Concentration in % | Degree of Destruction in % after 24 hours |
|---|---|---|
| (5) | | |
| 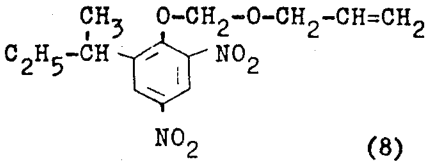 | 0.2 | 100 |
| (8) | | |
| 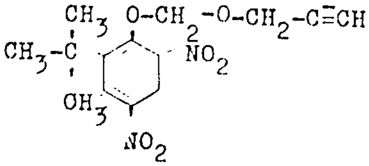 | 0.2 | 100 |
| (11) | | |
| 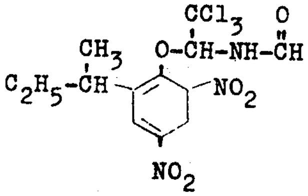 | 0.2 | 99 |
| (13) | | |
| 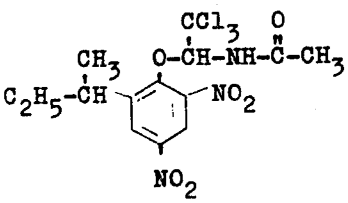 | 0.2 | 100 |
| (14) | | |
| 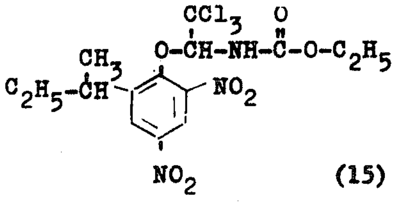 | 0.2 | 100 |
| (15) | | |
| 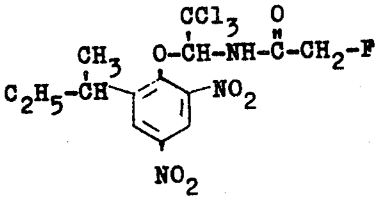 | 0.2 | 100 |
| (18) | | |
| 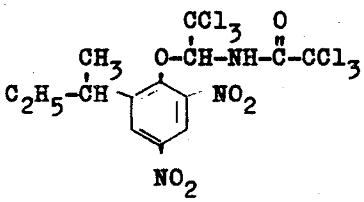 | 0.2 | 98 |
| (19) | | |

The following further examples illustrate, without limitation, the process for producing the particular new compounds of the present invention.

EXAMPLE 4

To a solution of 31 g of chloromethyl-propargyl-ether (0.3 mol) in 150 ml of toluene at room temperature there is added dropwise, while stirring, a solution of 48 g of 2-sec.-butyl-4,6-dinitrophenol (0.2 mol) and 20 g of triethylamine in 100 ml of toluene. The mixture is stirred for 1 hour at room temperature and subsequently for 1 hour at 60°–70°C and is filtered; the filtrate is evaporated in a waterpump vacuum. The oily residue is dissolved in 100 ml of boiling cleaning benzine, the solution is filtered and cooled, and the oil which separates out is isolated and crystallized on trituration. 43 g of 2-sec-butyl-4,6-dinitrophenoxymethyl-propargyl-ether of the formula:

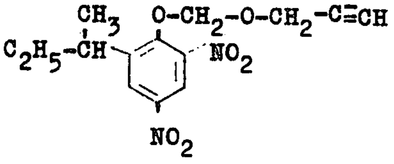

(10)

of melting point 53°–55°C are obtained as yellow-brown crystals.

The following compounds are manufactured in the same manner as described above:

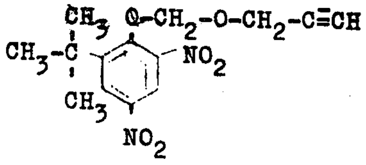

(11)

melting point 126°–127.5°

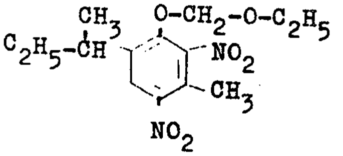

(21) oil

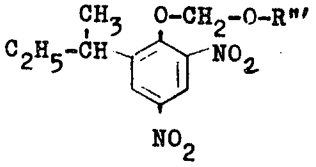

Ia

| Compound No. | R''' | $n_D^{20}$ |
|---|---|---|
| (2) | $CH_3$ | 1.5480 |
| (3) | $C_2H_5$ | 1.5395 |
| (4) | $-CH(CH_3)_2$ | 1.5340 |
| (8) | $-CH_2-CH=CH_2$ | 1.5440 |
| (5) | $-CH_2-$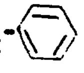 | 1.5650 |
| (7) | $-CH_2-CH_2-Cl$ | 1.5462 |

Continued

| | | | |
|---|---|---|---|
| (6) | $-CH(CH_3)-CH_2-CH(CH_3)_2$ | $n_D^{23}$ | 1.5165 |
| (12) | $-CH_2-C(Br)=CH-Br$ | $n_D^{22}$ | 1.5755 |
| (9) | $-CH_2-C\equiv C-CH_2-Cl$ | $n_D^{23}$ | 1.5539 |

EXAMPLE 5

A solution of 48 g of 2-sec.-butyl-4,6-dinitrophenol (0.20 mol) and 20 g of triethylamine in 100 ml of benzene is added dropwise at room temperature to a solution of 56 g of 1,2,2,2-tetrachloroethyl-carbamic acid ethyl ester (0.22 mol) in 150 ml of benzene. The mixture is stirred for a further 30 minutes at room temperature and subsequently for 2 hours at 50°–60°C, and cooled. The triethylammonium chloride is filtered off (27 g) and the filtrate is evaporated in vacuo. The oily residue crystallizes after prolonged standing. 81 g of 1-(2-sec.-butyl-4,6-dinitrophenoxy)-2,2,2-trichloroethyl-carbamic acid ethyl ester of the formula:

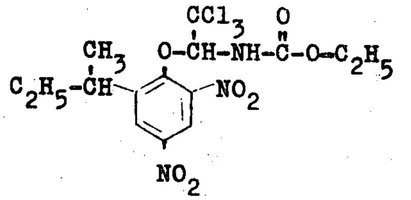

(15)

are obtained as yellow crystals of melting point 69°C (isopropanol/cleaning benzine).

The following compounds are obtained in the same manner as described in Example 5:

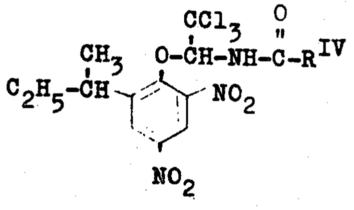

Ib

| | $R^{IV}$ | | |
|---|---|---|---|
| (13) | -H | melting point 102°-104°C | |
| (14) | $-CH_3$ | melting point 110°C | |
| (17) | $-CH_2-Cl$ | $n_D^{20}$ | 1.5563 |
| (19) | $CCl_3$ | $n_D^{20}$ | 1.5631 |
| (18) | $CH_2F$ | $n_D^{20}$ | 1.5404 |
| (16) | 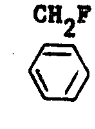 | oil | |
| (20) | 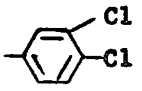 | $n_D^{20}$ | 1.5720 |

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Substituted methyl ethers of 2-branched alkyl 4,6-dinitrophenol of the formula:

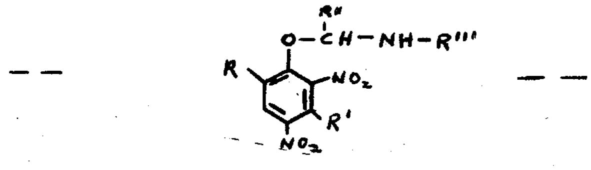

in which

R represents a branched alkyl radical with 3-12 carbon atoms,

R' represents hydrogen or methyl,

R'' represents hydrogen, or an alkyl, chloroalkyl or bromoalkyl radical containing up to 3 carbon atoms, and R''' represents an optionally chloro- or fluoro-substituted acetyl radical, an optionally chloro-, fluoro- or nitro-substituted benzoyl radical, an optionally chloro- or fluoro-substituted alkyl oxycarbonyl radical, or a chloro-, fluoro-, alkyl-, chloroalkyl- or fluoroalkyl-substituted phenyl oxycarbonyl residue wherein the alkyl radical consists of 1 to 12 carbon atoms.

2. Compound according to claim 1 in which

R represents a branched alkyl radical having 3-8 carbon atoms,

R''' represents acetyl, chloroacetyl or fluoroacetyl; benzoyl which may be substituted by chlorine or nitro groups; an alkoxy carbonyl radical having 2–13 carbon atoms; phenoxycarbonyl which may be substituted with an alkyl group having 1–12 carbon atoms or a lower chloroalkyl or fluoroalkyl group, the aforesaid oxycarbonyl containing radicals being optionally substituted by chlorine or fluorine.

3. Compound according to claim 1 wherein such compound is 1-(2-sec.-butyl-4,6-dinitrophenoxy)-2,2,2-trichloroethylcarbamic acid ethyl ester

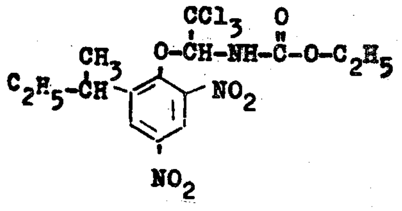

(15)

* * * * *

1050
(5/69)

UNITED STATES PATENT OFFICE
CERTIFICATE OF CORRECTION

Patent No. 3,868,404 Dated February 25, 1975

Inventor(s) GERHARD ZUMACH ET AL

It is certified that error appears in the above-identified patent and that said Letters Patent are hereby corrected as shown below:

Page 1, after Item [21] insert the following:

-- [30] FOREIGN APPLICATION PRIORITY DATA
May 6, 1969 Germany.........19 22 927.7 --.

Col. 11, Table 2, below the second structural formula insert

-- (2) --.

Col. 13, Table 2, cancel "(2)" above Compound (4).

Col. 13, Table 2, below last structural formula insert -- (11) --.

Col. 15, cancel "(11)" above Compound (13).

Col. 17, Table 3, below last structural formula insert -- (5) --.

Col. 19, Table 3, cancel "(5)" at top of Compound (8).

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*